(12) United States Patent
Schemmann et al.

(10) Patent No.: US 10,263,702 B2
(45) Date of Patent: Apr. 16, 2019

(54) RFOG ONU UPSTREAM SIGNAL OPTIMIZATION

(71) Applicant: ARRIS Enterprises LLC, Suwanee, GA (US)

(72) Inventors: Marcel F. Schemmann, Maria Hoop (NL); Venkatesh G. Mutalik, Middletown, CT (US); Zhijian Sun, Avon, CT (US); Zoran Maricevic, West Hartford, CT (US)

(73) Assignee: ARRIS Enterprises LLC, Suwanee, GA (US)

( * ) Notice: Subject to any disclaimer, the term of this patent is extended or adjusted under 35 U.S.C. 154(b) by 59 days.

(21) Appl. No.: 15/423,176

(22) Filed: Feb. 2, 2017

(65) Prior Publication Data
US 2018/0219627 A1    Aug. 2, 2018

(51) Int. Cl.
| H04J 14/00 | (2006.01) |
|---|---|
| H04B 10/2575 | (2013.01) |
| H04B 10/29 | (2013.01) |
| H04B 10/50 | (2013.01) |
| H04B 10/66 | (2013.01) |
| H04Q 11/00 | (2006.01) |

(52) U.S. Cl.
CPC ....... *H04B 10/25751* (2013.01); *H04B 10/29* (2013.01); *H04B 10/50* (2013.01); *H04B 10/66* (2013.01); *H04Q 11/0005* (2013.01); *H04Q 2011/0015* (2013.01); *H04Q 2011/0016* (2013.01); *H04Q 2011/0039* (2013.01)

(58) Field of Classification Search
CPC ........ H04B 10/29; H04B 10/50; H04B 10/66; H04B 10/25751; H04Q 11/0005; H04Q 2011/0015; H04Q 2011/0039; H04Q 2011/0016
USPC .......................................................... 398/45
See application file for complete search history.

(56) References Cited

U.S. PATENT DOCUMENTS

| 2010/0303471 A1* | 12/2010 | Khalouf ............... H04B 10/504 398/186 |
|---|---|---|
| 2013/0004179 A1* | 1/2013 | Nielsen ..................... H04B 3/50 398/115 |
| 2016/0028482 A1* | 1/2016 | Bujanos ........... H04B 10/07955 398/115 |
| 2017/0019723 A1* | 1/2017 | Mutalik .............. H04J 14/0221 |
| 2017/0099100 A1* | 4/2017 | Bush ................ H04B 10/25751 |

OTHER PUBLICATIONS

P. Pepeljugoski, et al., "Effect of Bit-Rate, Bias, and Threshold Currents on the Turn-on Timing Jitter in Lasers Modulated with Uncoded and Coded Waveforms", IEEE Photonics Technology Letters, vol. 8, No. 3, Mar. 1996, 3 pgs.

* cited by examiner

*Primary Examiner* — Tesfaldet Bocure
(74) *Attorney, Agent, or Firm* — Lori Anne D. Swanson

(57) ABSTRACT

Systems and methods for relaying upstream signals received from a plurality of subscribers to a remote head end. Preferably, the systems and methods use a switch that selectively opens when upstream RF signals are not present and closes when upstream RF signals are present, in a manner that reduces noise.

20 Claims, 6 Drawing Sheets

RFOG ONU UPSTREAM SIGNAL OPTIMIZATION

BACKGROUND

The present disclosure relates to systems and methods that process signals over a cable transmission network.

Although Cable Television (CATV) networks originally delivered content to subscribers over large distances using an exclusively RF transmission system, modern CATV transmission systems have replaced much of the RF transmission path with a more effective optical network, creating a hybrid transmission system where cable content originates and terminates as RF signals over coaxial cables, but is converted to optical signals for transmission over the bulk of the intervening distance between the content provider and the subscriber. Specifically, CATV networks include a head end at the content provider for receiving RF signals representing many channels of content. The head end receives the respective RF content signals, multiplexes them using an RF combining network, converts the combined RF signal to an optical signal (typically by using the RF signal to modulate a laser) and outputs the optical signal to a fiber-optic network that communicates the signal to one or more nodes, each proximate a group of subscribers. The node then reverses the conversion process by de-multiplexing the received optical signal and converting it back to an RF signal so that it can be received by viewers.

Cable television (CATV) networks have continuously evolved since first being deployed as relatively simple systems that delivered video channels one-way from a content provider. Early systems included transmitters that assigned a number of CATV channels to separate frequency bands, each of approximately 6 MHz. Subsequent advancements permitted limited return communication from the subscribers back to the content provider either through a dedicated, small low-frequency signal propagated onto the coaxial network. Modern CATV networks, however, provide for not only a much greater number of channels of content, but also provide data services (such as Internet access) that require much greater bandwidth to be assigned for both forward and return paths. In the specification, the drawings, and the claims, the terms "forward path" and "downstream" may be interchangeably used to refer to a path from a head end to a node, a node to an end-user, or a head end to an end user. Conversely, the terms "return path" "reverse path" and "upstream" may be interchangeably used to refer to a path from an end user to a node, a node to a head end, or an end user to a head end.

Recent improvements in CATV architectures that provide further improvements in delivery of content include Fiber-to-the Premises (FTTP) architectures that replace the coaxial network between a node and a subscriber's home with a fiber-optic network. Such architectures are also called Radio Frequency over Glass (RFoG) architectures. A key benefit of RFoG is that it provides for faster connection speeds and more bandwidth than current coaxial transmission paths are capable of delivering. For example, a single copper coaxial pair conductor can carry six simultaneous phone calls, while a single fiber pair can carry more than 2.5 million phone calls simultaneously. FTTP also allows consumers to bundle their communications services to receive telephone, video, audio, television, any other digital data products or services simultaneously.

One existing impairment of RFoG communication channels is Optical Beat Interference (OBI), which afflicts traditional RFoG networks. OBI occurs when two or more reverse path transmitters are powered on, and are very close in wavelength to each other. OBI limits upstream traffic, but also can limit downstream traffic. Existing efforts at mitigating OBI have focused on Optical Network Units (ONUs) at the customer premises, or on the CMTS at the head end. For example, some attempts to mitigate OBI make the ONUs wavelength specific while other attempts create an RFoG-aware scheduler in the CMTS. Still others attempts have included changing ONU wavelengths on the fly. Due to the fundamental nature of lasers and DOCSIS traffic, none of the above techniques yield satisfactory results as wavelength collisions still occur or cost is high. Thus, it may be desirable in RFoG deployments to further reduce or eliminate OBI.

DETAILED DESCRIPTION

Figure 1:
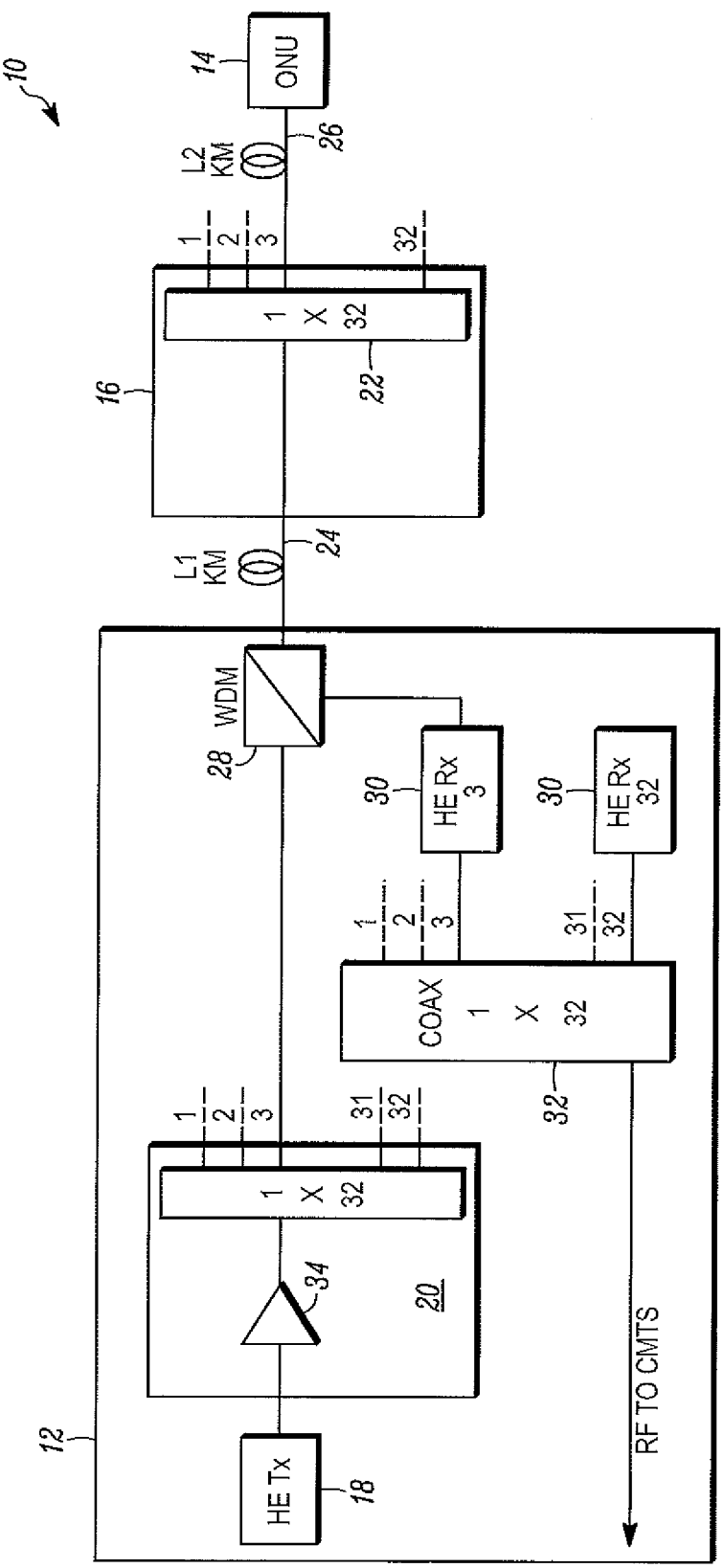
FIG. 1 shows an existing RFoG architecture.

FIG. 1 shows an exemplary existing RFoG system 10, where a head end 12 delivers content to an ONU 14 at a customer's premises through a node 16. An RFoG topology includes an all-fiber service from the head end 12 to a field node or optical network unit (ONU), which is typically located at or near the user's premises. In the head end 12, a downstream laser sends a broadcast signal that is optically split multiple times. The optical network unit, or ONU, recovers the RF broadcast signal and passes it into the subscriber's coax network.

The head end 12 typically includes a transmitter 18 that delivers a downstream signal to one or more 1×32 passive splitters 20 that includes 32 output ports, each output port connected to a wavelength division multiplexer (WDM) splitter 28 that delivers the downstream content over a fiber transmission segment 24 to the node 16, which in turn includes another 1×32 splitter 22, where each output port of the splitter 22 is connected via another fiber segment 26 to a particular ONU 14 at a subscriber's premises.

Optical networking units (ONUs) in an RFoG environment terminate the fiber connection at a subscriber-side interface and convert traffic for delivery over the in-home network at the customer premises. Coaxial cable can be used to connect the ONUs of an RFoG network to one or more user devices, where the RFoG user devices can include cable modems, EMTAs, or set-top boxes, as with the user devices of an HFC network. For example, the ONU 14 may connect to set-top boxes, cable modems, or similar network elements via coaxial cable, and one or more of the cable modems may connect to the subscriber's internal telephone wiring and/or to personal computers or similar devices via Ethernet or Wi-Fi connections.

Those of ordinary skill in the art will appreciate that the foregoing architecture is illustrative only. For example, the number of ports of the splitters 20 and 22 may be changed, as desired. It should also be understood that the head end 12 may include more splitters 20, each splitter having outputs connected to a respective node so as to serve a great number of subscribers.

Along the return path from the subscriber's ONU 14 to the head end 12, the splitter 22 operates as a combiner, i.e. up to 32 ONUs may deliver return path signals to the node 16, which combines them for upstream transmission along fiber length 24. Each of the signals from the respective ONU's 14 is then separated from other signals by the WDM 28 to be received by a separate receiver 30 in the head end 12. The signals from the respective receivers are then combined by a combiner 32 for transmission to a Cable Modem Termination Service (CMTS) in the head end 12. The signals are combined in the RF domain in the head end 12 by the combiner 32, before being connected to the CMTS upstream port. Combined with the forward power limit on the fiber, the combined signals requires one forward fiber (L1 km) per group of 32 subscribers.

In the forward direction, the forward transmitter is provided to a higher power multi-port amplifier that distributes power. For example, in the head end 12, the transmitter 18 provides output to an Erbium Doped Fiber Amplifier (EDFA) 34 that internally distributes power over the 32 outputs of the combiner 20, each output operated at a relatively high power, e.g. approximately 18 decibel-milliwatts (dBm). The WDM 28 typically passes 1550 nm light from the EDFA 34 in forward direction and directs reverse light, typically at 1610 nm or perhaps 1310 nm in the reverse direction to the receivers 30. The WDM 28 may be connected to a fiber of length L1 that feeds the splitter 22 in the node 16. The outputs of the splitter 22 are each provided to second fibers of length L2 that are respectively connected to ONUs 14 at the subscriber homes. Typically, L1+L2 may be up to 25 km. The ONUs 14 convert the forward transmitted light to RF signals for the in-home coaxial network. The ONUs 14 also receive RF signals from the in-home network and modulate these signals onto a laser, operating at 1610 nm for example, and the laser's output is sent upstream into the fiber L2. The upstream signal is combined with other upstream signals in the combiner 22 and transmitted further upstream in the fiber L1. At the WDM 28 the upstream signals are directed towards the head end receivers 30.

The loss budget for 32 subscribers and 25 km of fiber requires one receiver in the head end 12 for every group of 32 subscribers; given an upstream transmission power of 3 dBm, the receivers 30 and the WDM 28 may typically operate at a power between −18 and −21 dBm, making a good signal to noise ratio challenging, such that band limited receivers are usually required for acceptable performance. Furthermore, the passive optical combiner 22 that combines multiple optical inputs to a single output by definition creates OBI between these inputs, as described earlier and will therefore create noise in the RF domain at the head end receivers 30. Furthermore, a loss of around 24 dB must also be assumed in the forward path; for an EDFA output power of 18 dBm per port, this provides −6 dBm power to the receivers. This is sufficient for acceptable performance at the ONU to 1 GHz, provided low noise, high gain receivers are used.

The disclosed techniques for eliminating OBI is desirable, and the disclosed manner for eliminating OBI as disclosed may enable higher capacity in the upstream and downstream. Further, the disclosed combiner and features of the combiner may enable RFoG coexistence alongside traditional HFC/D3.1 systems and future potential PON systems. The elimination of OBI is critical in some systems to unlock the vast potential of the optical fiber. Described in more detail herein are embodiments for an architecture that incorporates the disclosed optical combiner system.

Figure 2:
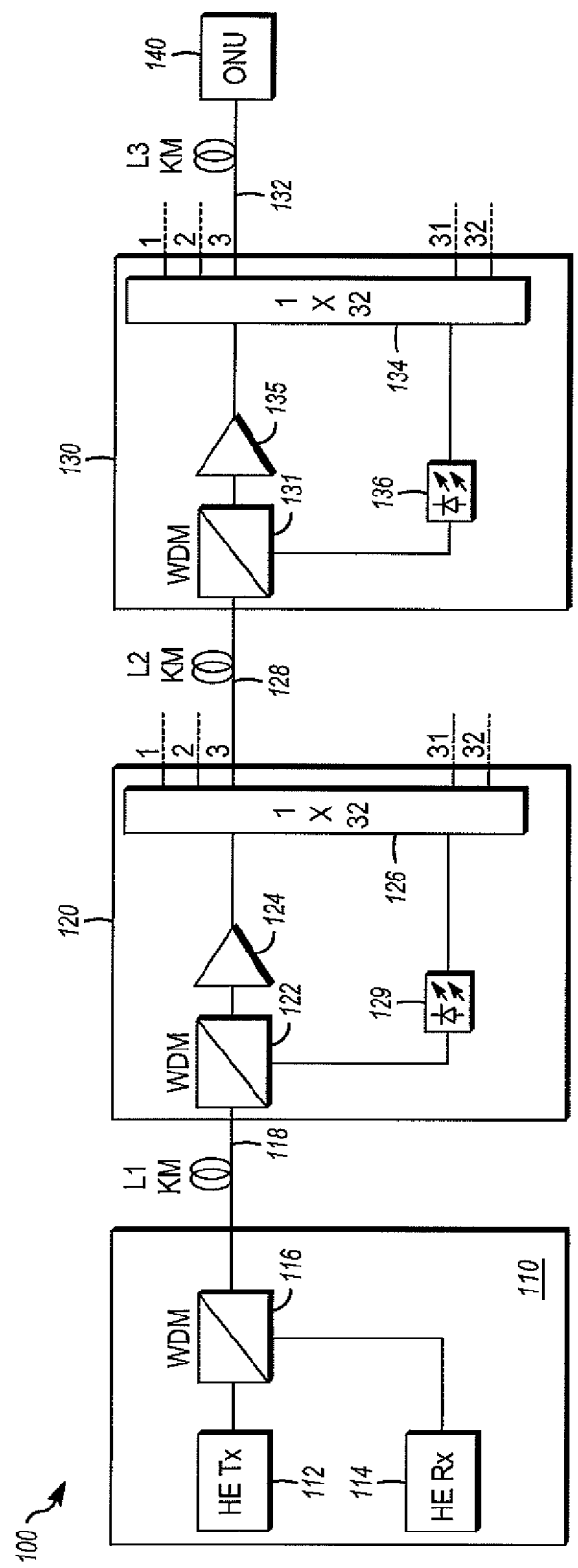
FIG. 2 shows an improved RFoG architecture.

FIG. 2 shows an improved system 100 for delivering CATV content to a plurality of subscribers over an RFoG network. The architecture shows a head end 110 having a transmitter 112 and receiver 114 each connected to a WDM splitter 116 that outputs a signal to, and receives a signal from, a fiber link 118 of L1 km. The fiber link 118 is connected to an active splitter/combiner unit 120. The splitter/combiner unit 120 may preferably include a WDM 122 that separates forward path signals from reverse path signals. The forward path signal from the WDM 122 is provided to an EDFA 124 that outputs an amplified optical signal to an active 1×32 splitter 126 that has 32 output ports, each to respective second fiber links 128. At each port, the power level can be modest (e.g. in the 0-10 dBm range) but can also be high (e.g. in the 18 dBm range).

In the reverse direction, the 1×32 port splitter 126 operates as an active combiner 126, and includes, at each port, a WDM that directs upstream light to a detector at the port, which converts received optical signals to electrical signals, amplifies them in the RF domain, and provides the electrical signals to a transmitter 129 that outputs light at, for example, 1610 nm, 1310 nm, or some other appropriate wavelength, provided to the WDM 122, which in turn directs the upstream light into fiber 118. At the head end 110, the fiber 118 is connected to WDM 116 that directs the upstream light to the receiver 114.

Each of the 32 ports of the splitter/combiner 126, through a respective fiber 128, output a respective signal to a second active splitter/combiner unit 130 of the same type and configuration as the splitter/combiner unit 120, with WDM 131 and EDFA 135. The length(s) of the fiber 128 may vary with respect to each other. The output power per splitter port is low, around 0 dBm. The splitter ports are connected to ONUs 140, for instance in a Multiple Dwelling Unit (MDU) or a neighborhood, via fiber 132 of length L3. In a basic RFoG system, the sum of the fiber lengths L1+L2+L3 is up to 25 km. The system 100, however, will permit a higher total length of fiber between the head end 110 and the ONUs 140, such as 40 km, because the system 100 can tolerate a higher SNR loss, as further described below.

The upstream signals from the ONU 140 are individually terminated directly at the active splitter/combiner unit 130; even for ONUs operating at 0 dBm, the power reaching the detectors is around −2 dBm (the fiber 132 is a short fiber up to a few km, and the WDM loss inside the active combiner is small). This is almost 20 dB higher than in existing RFoG systems, meaning that the RF levels after the detector in the splitter 134 is almost 40 dB higher than in existing RFoG systems. As a consequence, the receiver noise figure is not critical, and high bandwidth receivers can be used with relatively poor noise performance. The received RF signal is re-transmitted via the transmitter 136 along the reverse path into fiber 128 and received and retransmitted by the preceding active splitter/combiner unit 120 and thereafter to the head end 110. Although the repeated re-transmission leads to some incremental reduction in SNR, improvements in SNR from the active architecture provides much greater overall performance relative to traditional RFoG systems. More importantly, because all reverse signals are individually terminated at separate detectors, there can be no optical beat interference (OBI) between different reverse signals. The reverse signals are not combined optically, hence OBI cannot occur.

Although in some embodiments, the RF splitter/combiner units such as 120 and 130 may use an RF combiner to combine respective electrical signals from each detector at each port, this may produce unacceptable losses in the upstream transmission from the ONU to the head end. Therefore, the RF splitter/combiner units 120 and 130 preferably have the detectors arranged in a transmission line structure such as shown in FIG. 2, which will not incur such high signal loss.

In the forward direction there may be multiple EDFAs, such as EFDA 124 in the splitter/combiner unit 120; these EDFAs are cost effective single stage devices with low power dissipation—typically 2 Watts or less. Cascading the EDFAs results in an accumulation of noise due to the finite noise figures of the EDFAs. Whereas the active splitter architecture does not require the EDFAs, since an EFDA (not shown) in a high power head end 110 could still be used to provide power to the ONUs 140, the use of EDFAs, such as the EFDA 124, inside the active splitter units provides some advantages. For example, the complexity and power dissipation of equipment in the head end 110 is greatly reduced, as is the fiber count emanating from the head end 110. The amount of power delivered to the ONUs 140 is readily increased to approximately 0 dBm from −6 dBm in a traditional RFoG system. As a consequence, ONU receivers obtain 12 dB more RF level from their detectors and do not need as high a gain or a low a receiver noise contribution. Even with relaxed noise requirements at the ONU receivers, the SNR impact due to EDFA noise is easily overcome due to the higher received power. In addition, more spectrum can be supported in the forward direction with an acceptable SNR relative to current architectures, such as 4 GHz instead of 1 GHz in current RFoG, hence total data throughput rates can grow significantly without a change in operation to permit for example, services that provide 40 Gbps download speeds and 10 Gbps upload speeds.

In some embodiments, the optical combiner provides upstream and downstream RFoG capability and a completely transparent and reciprocal avenue for PON transmission. The optical combiner may enable complete transparency for PON deployments. For example, the optical combiner may enable OBI-free and high capacity features by deployment in compatible HFC D3.1 capable FTTH networks. Likewise, the optical combiner may be incorporated in to GPON, 1G-EPON, XGPON1, 10G/1G-EPON, 10G/10G-EPON. The compatibility with HFC and D3.1 enables the disclosed optical combiner to be deployed alongside a current HFC network, and is D3.1 ready. The optical combiner may be deployed on a fiber node, on multiple dwelling unit (MDU) and on single family home (SFU) deployments.

Embodiments for an RFoG combiner include preventing or eliminating OBI at the combiner as opposed to managing it at the extremities of the network (such as using a CMTS scheduler at the head end side of the network or wavelength specific ONUs at the subscriber end of the network). Embodiments are described that enable elimination of OBI. The disclosed optical combiner may be used to eliminate OBI, enhance capacity, and/or enable multiple services in RFoG, the cable version of FTTH networks.

The disclosed optical combiner may be independent of ONUs, Cable Modems and CMTSs. The disclosed optical combiner may be CMTS-agnostic, thus eliminating the need to create an RFoG-aware scheduler, which is both restrictive and time consuming. The optical combiner makes a cable version of FTTH more feasible, as compared to the PON alternatives. For example, in embodiments, the disclosed optical combiner has a reciprocal PON pass-thru capability of the optical combiner along with a high upstream and downstream capacity, which assists RFoG deployment without interruption to the underlying system, or impairing future inclusion of PON functionality, such as later PON deployment on an RFOG system.

In some embodiments, the optical combiner has 32 ports, but only requires one transmit port, one receive port, and one WDM component at the headend. Thus, instead of requiring 32 WDMs and 32 receive ports, the disclosed optical combiner may save on head end space and power. The combiner may be an active device that needs approximately 2 Watts of power. The optical combiner may be powered by power sources readily available in the RFoG system, or power can be provisioned into the optical combiner. The power source may include a battery back-up or solar/fiber power alternatives. If the power is lost and the battery has also drained, the entire reciprocal PON transmission is unaffected. The upstream RFoG transmission is however stopped. In a conventional RFoG system it would have been stopped also because the preponderance of OBI would have severely impaired the system anyway if the system was a traditional RFoG system with a passive combiner. Also in case of power loss, ONU (Optical Networking Unit) at the homes would cease to function such that without any power backup such systems will cease to function, whether those are RFoG or PON systems, with or without the active combiner disclosed here. The head end optical receiver 114 may only need an input power range from 0 . . . −3 dBm, and require 15 dB less RF output power due to the absence of the RF combiner such that with such a high optical input power and low RF output power requirement the gain can be low.

The disclosed optical combiner may preferably eliminate OBI, making an OBI-free system. The optical combiner enables long reach and large splits, e.g. up to 40 km and 1024 splits, which will expand even further. The high upstream and downstream capacity enabled by the disclosed optical combiner includes up to 10G DS/1G US, and as high as 40G DS/10G US.

In embodiments, the disclosed optical combiner prevents interference in RFOG deployments in the combiner rather than preventing interference using measures taken in the ONU where previous attempts have failed or proven to be cost-prohibitive.

Figure 3:
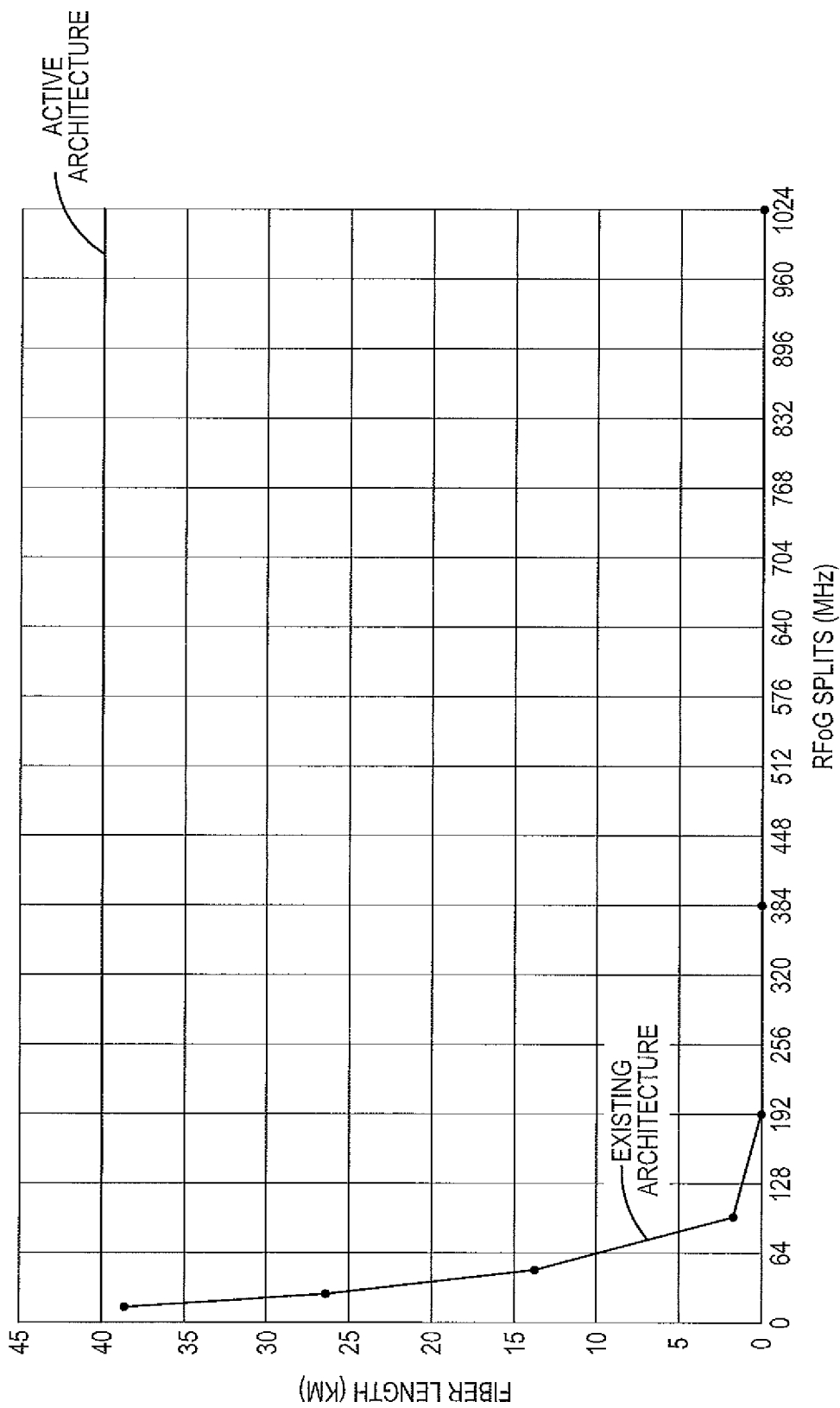
FIG. 3 compares capabilities of the architectures of FIGS. 1 and 2.

Traditional RFoG architectures have a fixed power budget. This means that as fiber length between the head end and the ONUs increases, a smaller number of splits may be used, as can be seen in FIG. 3 where the lower, curved line represents the existing architecture and the upper, curved line represents the active architecture disclosed herein. Conversely, the more splits that are desired, the less fiber length may be deployed. The disclosed active architecture, however, enables fiber length of up to approximately 40 km irrespective of the number of splits used, meaning that the disclosed active architecture permits fiber lengths of 40 km or more along with a large number of splits, e.g. 1024, thereby advancing FTTP topology and deployment.

The overall cost of the active splitter architecture shown in FIG. 2 is similar to that of a traditional RFoG solution. The cost of active splitter EDFA gain blocks and WDM and detector components in the active architecture is offset by the elimination of head end gear such as receivers, high power EDFAs and combiners. A cost reduction of the ONUs that can operate with lower output power further supports the active splitter architecture. Further advantages of the active splitter architecture may include a reduction in outgoing fiber count from the head end, which can have a large impact on system cost, as well as an option to use 1310 nm reverse ONUs while staying within a typical SNR loss budget, which can further reduce costs. Also, the system shown in FIG. 2 exhibits increased bandwidth relative to what existing RFOG architectures are capable of providing, avoiding limits on service group sizes and concomitant requirements for more CMTS return ports. Finally, unlike OBI mitigation techniques in existing RFoG architectures, the system shown in FIG. 2 does not require cooled or temperature controlled optics and bi-directional communication links that necessitate additional ONU intelligence.

Each of these factors provides a further cost advantage of an active splitter solution over existing RFoG architectures. Required space and power in the head end is also reduced; the active splitter solution requires one transmit port, one receive port and one WDM component. Existing RFoG architectures, on the other hand, requires transmit ports, multi-port high power EDFAs, 32 WDM's, 32 receiver ports, and a 32-port RF combiner. Existing RFoG architectures require very low noise, high gain, and output power receivers with squelch methods implemented to overcome power loss and noise addition in the RF combiner. The system 100 shown in FIG. 2, conversely, works with input power normally in the 0-3 dBm range, little gain is required, and requires 15 dB less power output due to the absence of the RF combiner before the CMTS.

Preferably, the disclosed optical combiner unit implements a transmission line approach to combine multiple optical photodetectors in a single optical receiver. This may be accomplished in unidirectional or bidirectional configurations. A unidirectional system provides no control communication signals from an active optical splitter to an ONU, i.e. control communication signals only pass from an ONU to an active splitter. Thus, in a unidirectional system, an active optical splitter simply accepts an output level from an ONU and operates with that output level. A bidirectional system passes control signals from an active optical splitter to ONUs instructing them to adjust their output power; this type of system permits accurate equalization of the input levels to the active optical splitter from each ONU.

Some active splitter/combiner systems may preferably include redundancy where active optical splitters switch their return laser power (the return laser that carries the combined information of the ONUs connected to it) between a high and a low power state or operates this laser in CW mode. In that case an upstream head end or active optical splitter can easily detect loss of power at an input port and enable a second input port connected to another fiber route to receive the information; in the forward path, the other fiber route would also be activated in this case because generally the forward and reverse light share the same fiber. Also, some active splitter/combiner systems may include a reverse laser in the active optical splitter that adjusts its power output as a function of the number of ONUs transmitter to the active optical splitter and the photocurrent received from these ONUs. Still other active splitter/combiner systems may have a gain factor and reverse laser power of the active optical splitter set to a fixed value.

Preferably, the disclosed optical combiner unit is able to configure itself under changing circumstances. Instances occur in which cable modems in the ONU are required to communicate with the CMTS even if there is no data to be transmitted. Usually, however, the ONU is turned off during periods when there is no data to be transmitted between the ONU and CMTS, and a cable modem could go hours before receiving or sending data. Thus, in some embodiments the disclosed combiner unit may be configured to stay in communication with the CMTS. Cable modems may be required to communicate back to the CMTS once every 30 seconds, or some other appropriate interval.

In traditional RFoG architectures and similar last-mile optical networks such as Gigabit Passive Optical Networks (GPON) and Ethernet Passive Optical Networks (EPON), it is important to precisely regulate upstream traffic to ensure that no more than one subscriber transmits an upstream signal at any given time over the same frequency channel. The system shown in FIGS. 1-3 addresses this issue by introducing multiple carriers in the upstream direction; within any given increment of time, various ONUs can transmit in the upstream direction along different RF carriers, i.e. distinct frequency bands. In essence, a one-dimensional time-division-multiplexed PON "space" is augmented into two-dimensional frequency-domain and TDM "linear space."

In traditional RFoG architectures, ONUs transmit information in bursts and at any point in time one or more ONUs can power on and begin transmitting information. As required by the DOCSIS specification, all ONUs are polled repeatedly with an interval up to 5 minutes but usually less. When an ONU turns on, the optical power transmitted by the ONU rises from zero to the nominal output power in a short time. As a consequence, the optical power received by the active splitter from that ONU goes through that same transition.

The system shown in FIG. 2 may tend to exacerbate noise transmitted along the upstream path. Such noise has four distinct origins. First, when the ONU laser, such as the transmitter 129 shown in FIG. 2 is operated in burst mode, and therefore has a sharp turn-on time in response to receipt of an upstream RF signal received from the 1×32 port combiner 126, low frequency noise is produced. Specifically, the slew rate with which the ONU turns on is abrupt enough to resemble a step function. As is well known from signal theory, a step function has a frequency spectrum that contains significant energy in the low frequencies, with declining energy as frequency rises.

A second source of noise is clipping noise where the upstream signal being transmitted exceeds the upper or lower limits of what the laser can transit. Clipping noise is also exacerbated by operating a laser in burst mode. When a laser receives a signal prior to the time that the laser has fully reached the bias point needed to accommodate the full amplitude of the signal, that signal can easily clip the laser's output. Moreover, the low frequency noise created by operating the laser in burst mode can itself readily overdrive the laser and cause laser clipping.

A third source of noise is optical noise caused by the laser itself, typically expressed as relative intensity noise (RIN), which is the power noise normalized to the average power level. Relative intensity noise Laser RIN depends on many quantities, such as frequency, output power, temperature, modulation frequency, time delay and magnitude of optical feedback, mode-suppression ratio, and relaxation oscillation frequency. Sources of RIN arise from both photodetection processes and fundamental quantum-state fluctuations in the light output of the laser.

A fourth source of noise is RF funneling noise, which occurs when a large number of devices are connected to a single laser, such as is the case in the system shown in FIG. 2. In such circumstances, the laser amplifies noise present in the signals of all connected devices. Funneling noise includes noise generated inside a subscriber's home, Gaussian noise generated by amplifiers in active devices, and noise resulting from insufficient shielding which results in the ingress of spurious electromagnetic variances into an RF signal, etc. Like low frequency noise, funneling noise may also increase the tendency of a laser to clip.

To ameliorate the noise described in the preceding paragraphs, some embodiments of the system of FIG. 2 may be operated such that the laser in the transmitter 129 never cycles to a fully "off" state. As one example, assuming e.g. that the transmitter 129 is biased to transmit upstream signals at +3 dB, then the laser may remain at +3 dB even when no input signal is present to transmit in the upstream direction. Operating the transmitter 129 in this mode would eliminate low frequency noise and clipping noise, but would exacerbate optical noise and funneling noise since all transmitters 129 would be constantly on. However, this may be an acceptable trade-off in circumstances where clipping noise would otherwise unacceptably degrade the signal, particularly since clipping noise is exacerbated by low frequency and funneling noise. Those of ordinary skill in the art will appreciate that if the transmitter 129 is to be biased to a different power level than +3 dB when transmitting an upstream signal, the transmitter 129 in this embodiment may preferably remain at that level even when no upstream signal is received.

Alternatively, in an alternate embodiment, the laser in the transmitter 129 may cycle between a fully "on" state when transmitting an upstream signal, a "stand-by" power state that is less than the fully "on" state, and an "off" state that is less than the "stand-by" power state after a threshold period of time has elapsed since the transmitter 129 has received an upstream signal to transmit. The threshold period of time may preferably be at least a minute. This embodiment takes advantage of the observation that upstream signals to a head end often occur in groups during certain intervals of a day. Thus, for example, in this embodiment, a transmitter 129 may operate in a mode where upstream signals are sent at, e.g. +3 dB, but the transmitter 129, instead of immediately dropping to a completely "off" state of say −30 dB will instead only drop to, e.g. −6 dB in anticipation of further bursts of transmission, so as to limit (rather than eliminate) low frequency noise and laser clipping, while also ameliorating the higher amount of laser and funneling noise that would result if the transmitter 129 were held in the fully on state. Those of ordinary skill in the art will again appreciate that the recited power level values of +3 dB, −6 dB and −30 db were exemplary only, and other values may be used as required for specific applications.

Figure 4:
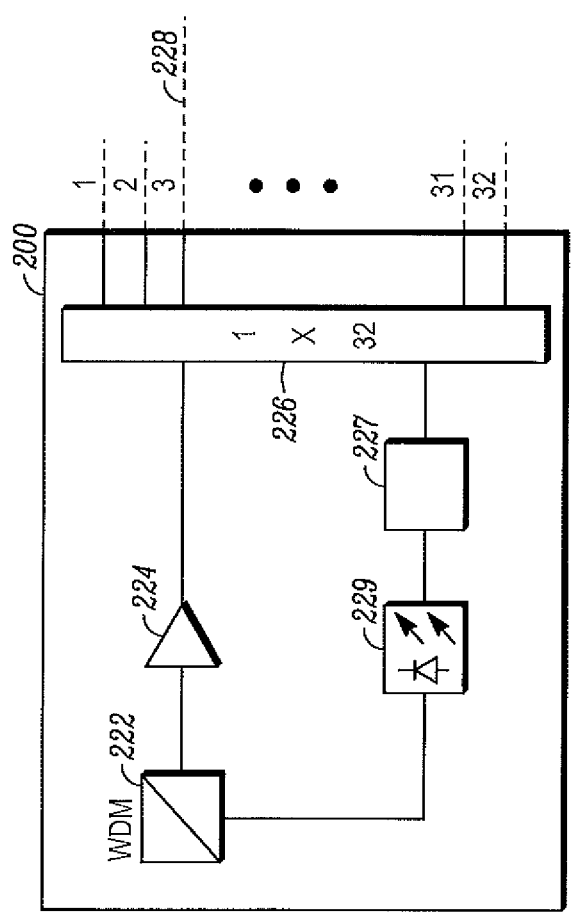
FIG. 4 shows a system for reducing noise in the architecture shown in FIG. 2.

Referring specifically to FIG. 4, the present inventors realized that the noise present in an upstream signal may also be ameliorated by the present of an RF switch placed in-line between a laser transmitter and a 1×32 port splitter that aggregates upstream signals from subscribers. Specifically, an active splitter/combiner unit 200 may include a 1×32 port splitter 226 which selectively receives respective upstream optical signals at one or more respective inputs 228, converts each to an RF signal in turn provided to a transmitter 229 that converts the received RF signals back to optical signals and forwards them to WDM 222 for retransmission upstream eventually reaching a CMTS of a head end. Between the 1×32 port splitter 226 and the transmitter 229 is an RF switch 227 that is open when no RF signal is detected and is closed when an RF signal is detected. Because the RF switch 227 prevents any RF feed to the transmitter 229 except during times when an upstream signal is present, funneling noise is virtually eliminated. In addition, in some embodiments, the RF switch 227 may operate with a delay so that the RF switch only provides an RF signal to the transmitter 229 after the laser in the transmitter 229 has fully turned on. This eliminates clipping noise entirely, even in embodiments when the transmitter 229 ramps from a completely off state to a completely on state. While such an embodiment truncates the upstream signal for an interval in which the transmitter 229 is rising to its fully on state, this interval will almost always be of a sufficiently short duration as to not significantly degrade the signal. In alternate embodiments, this delay may be set at a time less than the full turn-on time of the transmitter 229. For example, the delay may be set to a point corresponding to a time where the transmitter is estimated to be at 95% of its fully-on power state, 90% of its fully-on power state, 80% of its fully-on power state, etc.

Figure 5:
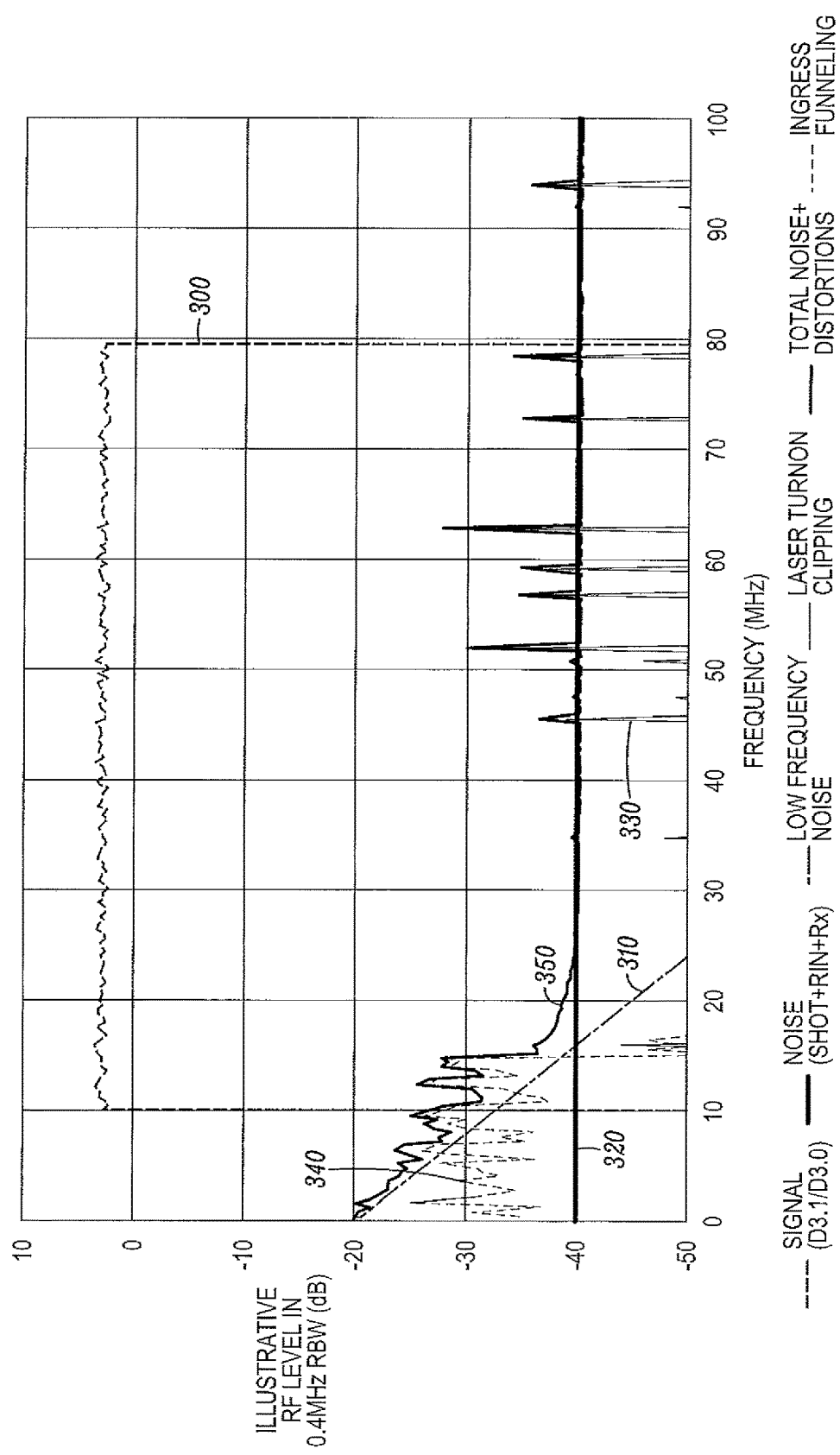
FIG. 5 shows different types of noise that may be reduced by the system of FIG. 4.
Figure 6:
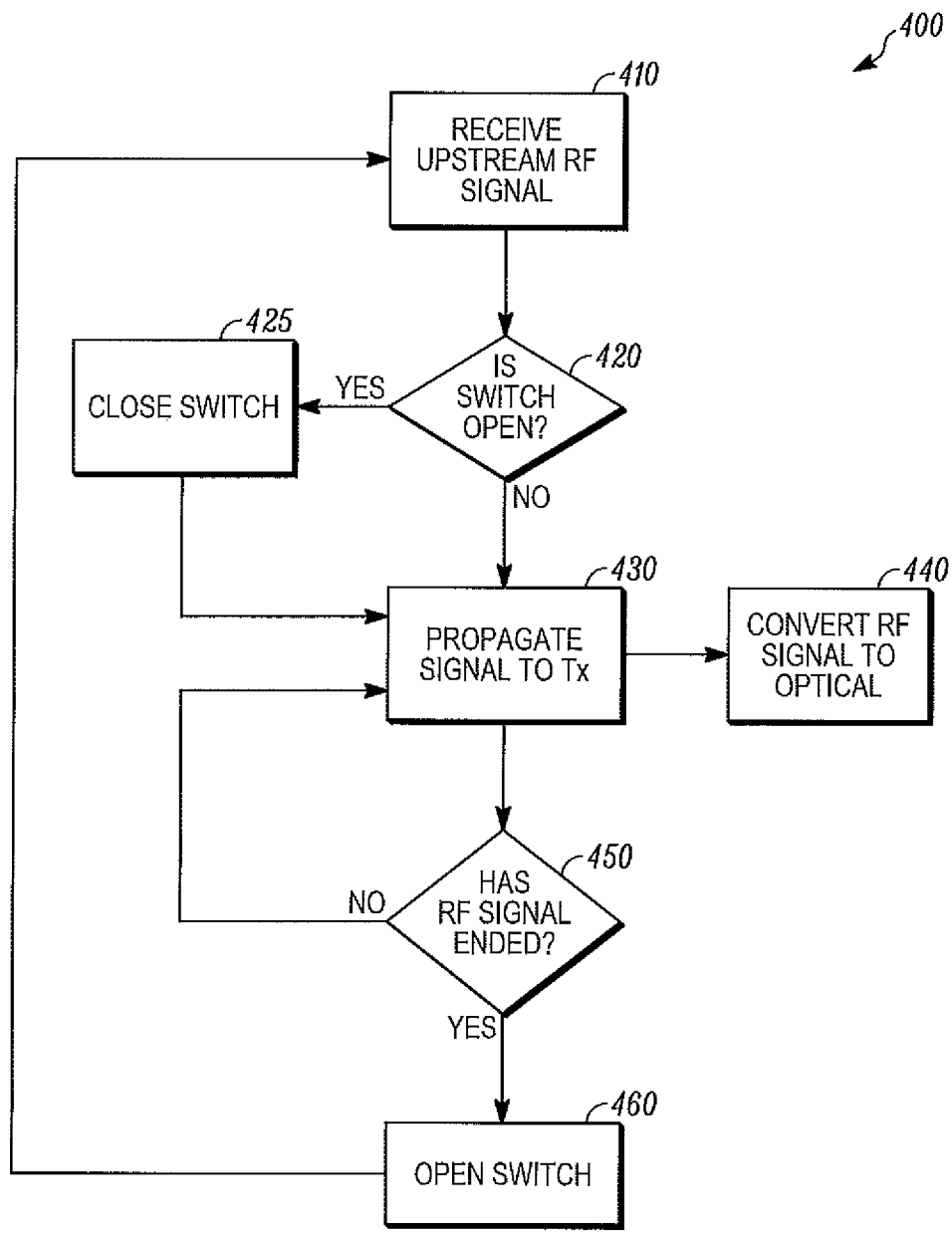
FIG. 6 shows an exemplary method for transmitting upstream content.

As appreciated by the discussion above, different embodiments may use different combinations of the disclosed features of controlling an appropriate power state of a transmitter and the use of the disclosed RF switch. For example, one embodiment may use an RF switch to truncate an RF connection to the transmitter's input when no signal is detected, but without delay when an input signal is received, where the transmitter is always in a fully on state. Another embodiment may use an RF switch to truncate an RF connection to the transmitter's input when no signal is detected, but with a delay, while the transmitter cycles between a fully on and a fully off state. FIGS. 5 and 6, in conjunction with Table 1 below, illustrate the results achieved by these various embodiments.

FIG. 5 illustrates the various sources of noise described above. Specifically, FIG. 5 shows a signal 300 encompassing a bandwidth of approximately 6 MHz to 80 MHz, which has a power of approximately 5 dB. The signal 300 is corrupted by low frequency noise 310, optical noise 320, clipping noise 330, and funneling noise 340, which together adversely affect the Signal-to-Noise Ratio (SNR) of the upstream data. The low frequency noise 310 has a profile that begins at 0 Hz with approximately −20 dB power and falls linearly until it is gone at approximately 25 Hz. The optical noise 320 holds a constant power of approximately −55 dB while the clipping noise comprises spikes at approximately 30 Hz, 42 Hz, 55 Hz, and 63 Hz. The funneling noise 340 has a profile that, at low frequencies, fluctuates about a moderate noise level before falling precipitously above approximately 15 MHz. Given these sources and levels of noise, FIG. 6 shows the total noise due to all these sources.

Table 1 below shows the effect on the optical noise 320, funneling noise 340, clipping noise 330, and low frequency noise 310 caused by various combinations of (1) selective on/off state power levels chosen for the transmitter 229; (2) having an RF switch 227 that isolates the transmitter from a source of an RF signal (and noise); and (3) also operating the RF switch 227 with a delay to ameliorate clipping. For example, if the transmitter 229 cycles between a fully on state of +3 dB and a fully off state of −30 dB, and has no switch 227, the optical and funneling noise are low relative to other permutations, but the clipping noise and low frequency noise are high relative to other permutations. Adding a switch 227 eliminates the funneling noise and having the switch 227 operate on a delay eliminates the clipping noise.

TABLE 1

| ON STATE | OFF STATE | SWITCH | DELAY | OPTICAL | FUNNELING | CLIP | LFN |
|---|---|---|---|---|---|---|---|
| +3 | +3 | No | No | High | High | None | None |
| +3 | +3 | Yes | No | High | None | None | None |
| +3 | +3 | Yes | Yes | High | None | None | None |
| +3 | −6 | No | No | Med | Med | Med | Med |
| +3 | −6 | Yes | No | Med | None | Med | Med |
| +3 | −6 | Yes | Yes | Med | None | None | Med |
| +3 | −30 | No | No | Low | Low | High | High |
| +3 | −30 | Yes | No | Low | None | High | High |
| +3 | −30 | Yes | Yes | Low | None | None | High |

Conversely, if the transmitter 229 operates continuously in an "on" state of +3 dB, and without a switch 129, the optical and funneling noise are high relative to other permutations, but the clipping and low frequency noise components are eliminated due to the absence of a turn-on time for the transmitter. Again adding an RF switch eliminates the funneling noise, but operating the switch 127 on a delay has no effect since the clipping noise has already been eliminated by operating the transmitter in an always-on state.

Finally, table 1 shows that if the transmitter 129 is cycled between an "always on" state of +3 dB and a "stand-by" state of −6 dB, without a switch, optical and funneling noise are higher than they would be if the transmitter cycled to a "fully-off" state rather than the "stand-by" state, but lower than they would be if the transmitter 129 were always on. Similarly, in this scenario the clip noise and the low frequency noise are each higher than they would be if the transmitter were always on, but lower than they would be if the transmitter cycled to a "fully-off" state rather than the "stand-by" state. Adding a switch 227 eliminates the funneling noise and having the switch 227 operate on a delay eliminates the clipping noise.

FIG. 6 shows an exemplary method 400 for transmitting an upstream RF signal received from a subscriber towards a head end, and used in conjunction with the system shown in FIG. 4. At step 410 the upstream RF signal is received. At decision step 420, it is determined whether the switch 227 is open or closed. If the switch 227 is closed, the method proceeds to step 430 where the signal is propagated to a transmitter which converts the RF signal to an optical signal at step 440. If the switch 227 is open, then the switch is closed at step 425 before proceeding to steps 430 and 440. After the transmitter begins transmitting an upstream RF signal, at decision step 450, it is determined whether the upstream RF signal has terminated. If the answer is no, then the transmitter continues to receive, convert, and transmit the signal in the upstream direction. If it is determined that the upstream RF signal has terminated, the switch 227 is opened at step 460 and the method proceeds back to step 410 for receipt of the next upstream RF signal when it occurs.

Some embodiments of the foregoing disclosure may encompass multiple cascaded active splitters that are configured to work with ONUs based primarily on optical input levels without requiring bidirectional communication. Other embodiments may encompass multiple cascaded active splitters that are configured to work with ONUs by using bidirectional communication.

Some embodiments of the foregoing disclosure may include an active splitter with multiple optical inputs, each providing an optical input to one or more detectors that together output a combined signal to a high pass filter that presents a low impedance to the detectors and rejects all signals below an RF frequency band and passes all signals above an RF frequency band before presenting the combined signal to an amplifier and a re-transmitting laser.

Some embodiments of the foregoing disclosure may include an active splitter with multiple optical inputs, each providing an optical input to one or more detectors that together output a combined signal, where the active splitter has a bias circuit with a sufficiently low impedance at low frequency such that all detectors can be illuminated at the same time without a significant drop in bias to the detectors.

Some embodiments of the foregoing disclosure may include an RFoG active splitter architecture where reverse lasers of the active splitter(s) and/or ONUs connected to the active splitter(s) are operated with a continuous output. Some embodiments of the foregoing disclosure may include an RFoG active splitter architecture where reverse lasers of the active splitter(s) and/or ONUs connected to the active splitter(s) are operated between a high and a low power mode such that the output power is high during bursts of upstream transmission and is otherwise low in output. Some embodiments of the foregoing disclosure may include an RFoG active splitter architecture where reverse lasers of the active splitter(s) and/or ONUs connected to the active splitter(s) may be selectively set to either one of a continuous mode and a burst mode.

Some embodiments of the foregoing disclosure may include an RFoG ONU that switches between a high and a low output power state where the output power is high during burst transmission of information and where the low output power state is above the laser threshold.

Some embodiments of the foregoing disclosure may include a bidirectional RF-over-fiber architecture with more than one re-transmission link in the reverse direction, where detected signals from preceding links are combined at each re-transmission link.

Some embodiments of the foregoing disclosure may include an active splitter that can transmit forward communication signals, with for instance a forward laser, or by modulating the pump current of an EDFA.

The terms and expressions that have been employed in the foregoing specification are used therein as terms of description and not of limitation, and there is no intention, in the use of such terms and expressions, of excluding equivalents of the features shown and described or portions thereof, it being recognized that the scope of the claimed subject matter is defined and limited only by the claims that follow.

The invention claimed is:

1. A device for relaying upstream signals from at least one subscriber to a head end, the device comprising:
   (a) a receiver having at least one input capable of detecting a first upstream optical signal and converting the detected optical signal to an RF signal;
   (b) an optical transmitter that outputs a second upstream optical signal using said RF signal as an input; and (c) a switch between the receiver and the optical transmitter that selectively and alternately connects the optical transmitter to the RF signal and disconnects the optical transmitter from the RF signal.

2. The device of claim 1 where the receiver is an RF combining unit.

3. The device of claim 2 where the RF combining unit is located in an active splitter.

4. The device of claim 1 where said switch connects the optical transmitter to the RF signal based on detection of an upstream communication from a subscriber.

5. The device of claim 4 where said switch connects the optical transmitter to the RF signal following a delay after the upstream communication from the subscriber is detected.

6. The device of claim 1 where the optical transmitter is operated in an "always on" state.

7. The device of claim 6 where the power of the optical transmitter cycles between a "fully on" state and a "standby state" having a power less than the "fully on" state but greater than an "off" state.

8. The device of claim 7 where the power of the optical transmitter falls to the "off" state after a threshold time is reached without receipt of an upstream optical signal from a subscriber.

9. A method for relaying upstream content between at least one subscriber and a head end, the method comprising:
(a) receiving a first upstream optical signal and converting the detected optical signal to an RF signal;
(b) propagating said RF signal to an open switch;
(c) closing said switch after receipt of said RF signal, where closing said switch propagates the RF signal to an input of an optical transmitter; and
(d) converting the RF signal to a second upstream optical signal.

10. The method of claim 9 wherein the steps for receiving and converting are included in an active splitter in an active splitter.

11. The method of claim 9 where said switch is closed after a delay.

12. The method of claim 9 where the RF signal is converted by a transmitter that cycles between a "fully on" state and a "standby state" having a power less than the "fully on" state but greater than an "off" state.

13. A method of operating a device having a receiver, a transmitter, and a switch positioned between the receiver and transmitter, the receiver capable of receiving selective upstream first optical signals from a subscriber, converting received said upstream first optical signals to corresponding RF signals, and sending the RF signals to the transmitter, the transmitter selectively receiving the RF signals from the receiver and converting the received RF signals to upstream second optical signals, the method comprising:
(a) opening the switch during intervals when the receiver sends no RF signals to the transmitter; and
(b) closing the switch when the receiver sends RF signals to the transmitter.

14. The method of claim 13 where the receiver is an RF combining unit.

15. The method of claim 14 where the RF combining unit is located in an active splitter.

16. The method of claim 13 where said switch connects the optical transmitter to the RF signal based on detection of an upstream communication from a subscriber.

17. The method of claim 13 where said switch is closed after a delay from the time the receiver sends a respective RF signal to the transmitter.

18. The method of claim 13 where the transmitter is operated in an "always on" state.

19. The method of claim 13 where the power of the transmitter cycles between a "fully on" state and a "standby state" having a power less than the "fully on" state but greater than an "off" state.

20. The method of claim 19 where the power of the optical transmitter falls to the "off" state after a threshold time is reached without receipt of an upstream optical signal from a subscriber.

* * * * *